US011944928B2

(12) United States Patent
Thomas et al.

(10) Patent No.: US 11,944,928 B2
(45) Date of Patent: Apr. 2, 2024

(54) FILTER ASSEMBLY AND MEDIA

(71) Applicant: Industrial Technologies & Services Americas Inc., Ocala, FL (US)

(72) Inventors: Allan Thomas, Port Richey, FL (US); Lindell Gay, Apopka, FL (US); Weijiang Chen, Machesney Park, IL (US); Michael Wilson, Royal Palm Beach, FL (US)

(73) Assignee: Industrial Technologies & Services Americas Inc., Ocala, FL (US)

( * ) Notice: Subject to any disclaimer, the term of this patent is extended or adjusted under 35 U.S.C. 154(b) by 212 days.

(21) Appl. No.: 17/213,847

(22) Filed: Mar. 26, 2021

(65) Prior Publication Data
US 2021/0299602 A1    Sep. 30, 2021

Related U.S. Application Data

(60) Provisional application No. 63/000,847, filed on Mar. 27, 2020.

(51) Int. Cl.
*B01D 46/00*    (2022.01)
*B01D 46/24*    (2006.01)
*B01D 46/62*    (2022.01)

(52) U.S. Cl.
CPC ..... *B01D 46/0004* (2013.01); *B01D 46/0001* (2013.01); *B01D 46/0005* (2013.01);
(Continued)

(58) Field of Classification Search
CPC ............... B01D 46/0004; B01D 46/62; B01D 46/0001; B01D 46/0005; B01D 46/003; B01D 46/2411; B01D 2265/022; B01D 2265/025; B01D 2265/027; B01D 2271/02; F16L 37/18
(Continued)

(56) References Cited

U.S. PATENT DOCUMENTS 1,047,070 A    12/1912    Kantrowitz
3,519,133 A    7/1970    Broering
(Continued)

OTHER PUBLICATIONS

Extended European Search Report for Application No. 21774271.7, dated Dec. 23, 2022.
(Continued)

*Primary Examiner* — Robert A Hopkins
*Assistant Examiner* — Qianping He
(74) *Attorney, Agent, or Firm* — Kevin E. West; Advent, LLP

(57) ABSTRACT

The present disclosure relates to a filter housing having a bowl and a head. The bowl is configured to house a portion of a filter cartridge. The bowl has an annular groove disposed about a rim of the bowl. The head is configured to mate with the bowl. The head includes an inlet, outlet, and a pair of levers. The inlet is to receive a flow of fluid into the filter housing. The outlet is to release the flow of fluid from the filter housing. The pair of levers are to draw the bowl partially into the head. Each lever has a first arm configured to mate with the annular groove, a second arm having a bearing surface, and a pivot disposed between the first arm and the second arm. A force upon the bearing surface urges the bowl into the head to form a seal.

12 Claims, 16 Drawing Sheets

(52) U.S. Cl.
CPC ........ *B01D 46/003* (2013.01); *B01D 46/2411* (2013.01); *B01D 46/62* (2022.01); *B01D 2265/022* (2013.01); *B01D 2265/025* (2013.01); *B01D 2265/027* (2013.01); *B01D 2271/02* (2013.01)

(58) Field of Classification Search
USPC ........................................................ 55/350.1
See application file for complete search history.

(56) References Cited

U.S. PATENT DOCUMENTS

| | | | |
|---|---|---|---|
| 3,760,951 A | 9/1973 | Mansfield | |
| 4,529,515 A | 7/1985 | Selz | |
| 4,989,636 A * | 2/1991 | Hunter | B01D 35/143 |
| | | | 210/DIG. 17 |
| 6,306,192 B1 * | 10/2001 | Greif | B01D 46/0084 |
| | | | 55/497 |
| 2003/0168394 A1 | 9/2003 | Gill | |
| 2007/0000829 A1 | 1/2007 | Boisvert | |
| 2007/0271884 A1 * | 11/2007 | Pearson | B01D 46/0012 |
| | | | 55/498 |
| 2011/0247974 A1 | 10/2011 | Gale et al. | |
| 2015/0014256 A1 | 1/2015 | Koreis et al. | |
| 2015/0202556 A1 | 7/2015 | Hawkins et al. | |
| 2016/0038862 A1 | 2/2016 | Barnwell | |
| 2018/0318738 A1 | 11/2018 | Chernov et al. | |
| 2019/0338876 A1 * | 11/2019 | Hartman | F16L 37/18 |

OTHER PUBLICATIONS

Office Action for Canadian Application No. 3,132,826, dated Sep. 28, 2023.

\* cited by examiner

FILTER ASSEMBLY AND MEDIA

CROSS-REFERENCE TO RELATED APPLICATIONS

The present application claims the benefit of priority of U.S. Provisional Application No. 63/000,847, filed Mar. 27, 2020, the entire contents of which are hereby incorporated herein by reference.

FIELD OF THE INVENTION

The present disclosure relates generally to filters. More particularly, the present disclosure relates, for example, to filter housings and/or filter media.

BACKGROUND OF THE INVENTION

Filter assemblies are known in the art for use in various applications, for example, internal combustion engines, hydraulic or pneumatic systems, and the like. These filter assemblies may be used to filter liquid and/or gaseous fluids in fuel systems, lubrication oil systems, hydraulic oil systems, air or exhaust filtration systems etc. There are different types of filters, such as canister type of filters, spin-on type of filters, etc. Servicing of such filter assemblies at regular intervals is important, as filter elements in these filter assemblies may tend to get clogged by impurities of the fluid being filtered, and may require replacement.

Compressed air filter elements are discrete pressure vessels containing a dedicated function filter element that may include various grades of particulate, coalescing and vapor removal filter elements. The elements are typically contained within a filter head and lower filter bowl that is attached by a threaded interface to secure the two components. A filter housing may see service for multiple years between servicing and replacing filter elements. Particularly on larger units, the thread flanks may become fused together via contaminants of seized metal surfaces, thus requiring significant wrenching loads to back off the threaded section. This sometimes results in galling and thread damage rendering the filter unit non-serviceable.

Depending on a variety of factors, fluid filtering may be improved by placing more than one filter unit in line to filter the fluid. In addition, the filter media within the filter unit may change depending upon these factors. Examples of factors influencing the filter and media include type of fluid, expected particle load to be filtered, flow rates, pressure levels, tolerance for pressure drop across the filter units, manufacture recommendations, empirical data, and the like.

It is desirable to have a filter housing that facilitates attachment to other filter housings and facilitates ease of filter media inspection and replacement. It is also desirable to have a filter media configured to remove particles and/or entrained droplets from the flowing fluid while providing a minimal amount of resistance to the flow of fluid. The present invention solves these and other problems as will be discussed in detail below.

SUMMARY OF THE INVENTION

Embodiments of the present disclosure advantageously provide for a filtering system, filter housing, and filter media for filtering debris from a fluid.

An embodiment of the disclosure pertains to a filter housing having a bowl and a head. The bowl is configured to house a portion of a filter cartridge. The bowl has an annular groove disposed about a rim of the bowl. The head is configured to mate with the bowl. The head includes an inlet, outlet, and a pair of levers. The inlet is to receive a flow of fluid into the filter housing. The outlet is to release the flow of fluid from the filter housing. The pair of levers are to draw the bowl partially into the head. Each lever has a first arm configured to mate with the annular groove, a second arm having a bearing surface, and a pivot disposed between the first arm and the second arm. A force upon the bearing surface urges the bowl into the head to form a seal.

Another embodiment relates to a method of generating a coalescing filter media to coalesce entrained oil droplets. In this method, a 24" roll of a coalescing filter media is disposed in a low pressure plasma system. The coalescing filter media has a thickness of 40-50 mils and a fiber size <1.5 microns. The low pressure plasma system is configured to deliver 1000 watts at 208 VAC and 5 amp of current. The low pressure plasma system is configured at a feed rate at 1 meter per minute. The plasma treated coalescing filter media is exposed to 250-1000 Standard cubic centimeter ("scc")/minute of dry fluorocarbon gas.

Another embodiment relates to a filter system comprising a filter housing including a bowl configured to house a portion of a filter cartridge, the bowl having a first end, a second end, and a groove defining a bearing surface disposed at or adjacent to the first end; a head configured to mate with the bowl, the head including an inlet to receive a flow of fluid into the filter housing, and an outlet to release the flow of fluid from the filter housing; and a lever configured to selectively secure the head to the bowl, the lever operable to move between a locked position in which the bowl is prevented from being removed from the head, and an unlocked position in which the bowl is free to be removed from the head.

In some aspects, the lever includes a cam surface configured to contact the bearing surface of the groove on the bowl when in the locked position.

In some aspects, the cam surface of the lever is configured to disengage the bearing surface of the groove on the bowl when in the unlocked position.

In some aspects, the groove is annularly disposed about a rim of the bowl.

In some aspects, the groove is a localized straight groove protruding from the bowl.

In some aspects, the lever is configured to rotate between the locked and unlocked positions.

In some aspects, a rod may be attached to a wing protruding from the head, wherein the lever includes a bore configured to receive the rod such that the lever is operable to rotate about the rod between the locked and unlocked positions.

In some aspects, rotating the lever upwardly by approximately 90 degrees in a direction toward the head moves the lever into the locked position.

In some aspects, rotating the lever downwardly by approximately 90 degrees in a direction toward the bowl moves the lever into the locked position.

In some aspects, an application of a force by the cam surface of the lever against the bearing surface of the groove urges the bowl into the head to form a seal.

In some aspects, contact between the cam surface of the lever and the bearing surface of the groove tightens when the bowl is pulled away from the head while in the locked position.

In some aspects, the bowl further comprises an O-ring seat configured to receive an elastomeric O-ring to prevent fluid leakage between the head and the bowl when in the locked position.

In some aspects, the shape of the head and the shape of the bowl are defined by a 45°-75° ellipse.

In some aspects, the shape of the head and the shape of the bowl are defined by a 60° ellipse.

In some aspects, the inlet and the outlet each include a respective bayonet fitting.

In some aspects, a second filter housing may be configured to releasably engage the bayonet fitting of the outlet of the head.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

Figure 1:
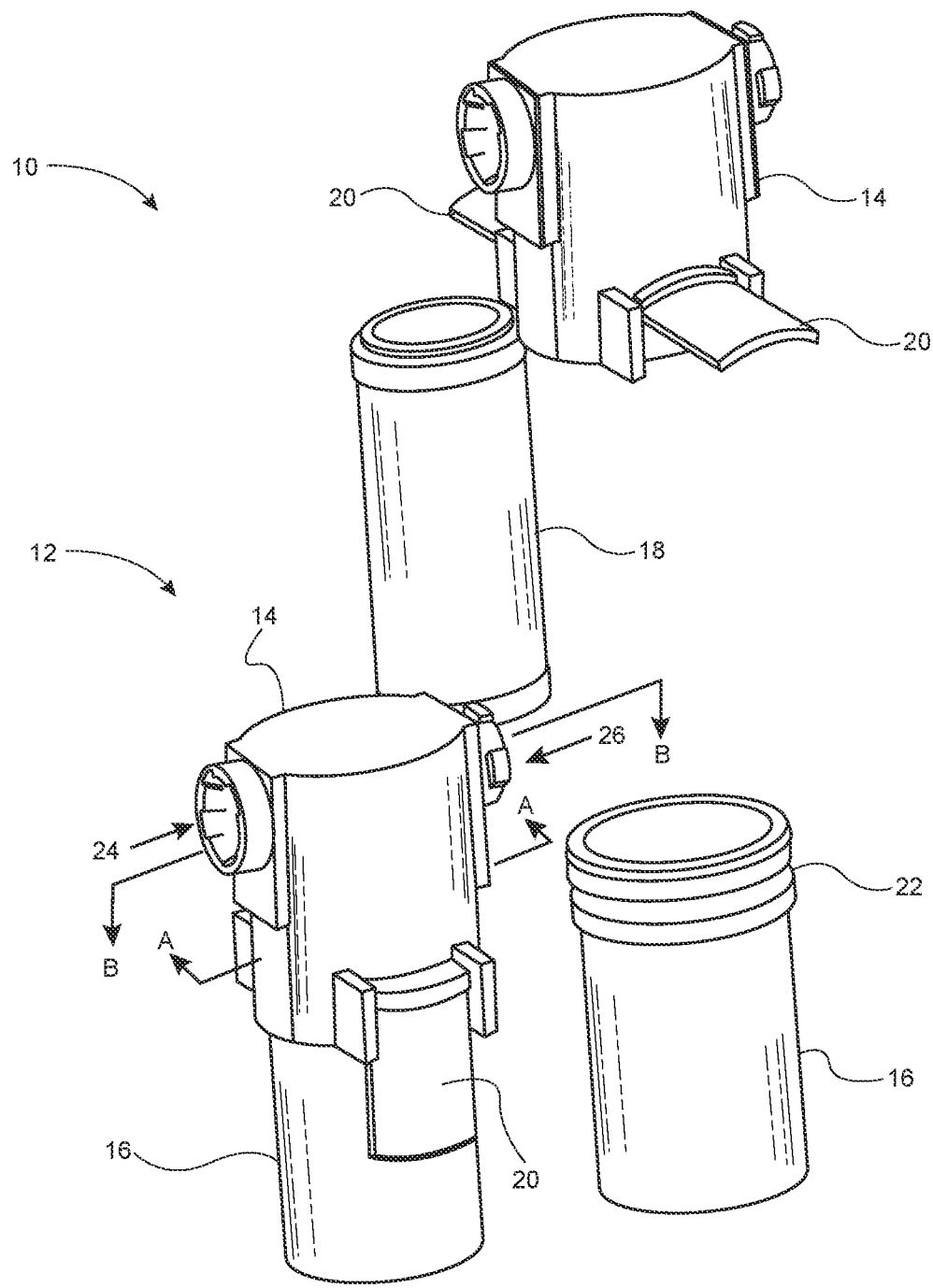
FIG. 1 is a perspective view of a filter system in accordance with an embodiment of the present disclosure.

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Embodiments of this disclosure may be useful in any suitable filtering scenario. For example, the housing and housing system as well as the filter media may be suitable in air, water, fuel, oil filtration, and the like. In a particular example, the housing and housing system as well as the filter media may be suitable for filtering compressed air in a pneumatic system. Compressed air filter elements are utilized as single points of services meaning utilizing only one type of filter. In many applications where improved performance is necessary filter-housings are strung together as multi-function devices. Typically, a filter string would start with a particulate filter, followed by a coalescer and finally by a vapor removal filter. Each preceding stage extends the life of the downstream filter by removing contaminants that would block the function of the downstream filter. The issue arises when joining filters in series requires the use of extended piping or dedicated designs requiring support hardware to mechanically join the filters using fasteners (nuts, bolts and washers) or through specialized clamps (viz. sanitary clamps).

Compressed air filter elements are discrete pressure vessels containing a dedicated function filter element that may include various grades of particulate, coalescing and vapor removal filter elements. The elements are contained within a filter head and lower filter bowl. The filter bowls are generally attached by a threaded interface or by use of a bayonet style attachment with interfacing members to secure the two components. A filter housing may see service for multiple years between servicing and replacing filter elements. Particularly on larger units the thread flanks may become fused together via contaminants of seized metal surfaces requiring significant wrenching loads to back off the threaded section. This sometimes results in galling and thread damage rendering the filter unit non-serviceable. Bayonet style method of attaching bowls are an improvement over threaded designs be when joined for a significant amount of time seals and locking members are also subject to binding a seizing requiring inordinate wrenching loads to release the two components.

Embodiments described herein may include one or more of the following improvements: modular connectivity, serviceable by hand and without tools or hardware, elliptical shape improve fluid flow through the filter housing to reduce pressure drop across housing to about 1.5 pounds per square inch ("psi") (10.3 kilo Pascal "kPa") from about 3 psi (20.6 kPa).

FIG. 1 is a perspective view of a filter system 10 in accordance with an embodiment of the present disclosure. As shown in FIG. 1, the filter system 10 includes a filter unit or filter housing 12. The filter housing 12 includes a head 14 and a bowl 16 configured to house a filter cartridge 18. The head 14 includes levers 20 configured to engage an annular groove 22 disposed in the bowl. The levers 20 are further configured to provide a grasping surface to provide mechanical advantage to a user so that the bowl 16 can be drawn tightly into the head 14 for a sealing arrangement. The levers 20 are further configured to provide a grasping surface to provide mechanical advantage to the user so that the bowl 16 can be withdrawn from the head 14 so that the filter housing 12 can be serviced and the filter cartridge 18 replaced if appropriate.

The head 14 includes an inlet 24 and an outlet 26. The inlet 24 is configured to allow a flow of fluid into the filter housing 12. The inlet 24 may have one or both of a bayonet-style fitting and a National Pipe Thread "NPT" fitting. For example, as shown, the inlet 24 includes an outer boss with a four lug bayonet-style fitting and an inner bore with a NPT fitting. In this manner, the inlet 24 may be secured to a supply pipe via the NPT fitting or secured to the outlet 26 of another filter housing 12 or other device with a matching bayonet-style fitting. Similarly, the outlet 26 may have one or both of a bayonet-style fitting and a NPT fitting for securing to a pipe or the inlet 24 of another filter housing 12.

Figure 2:
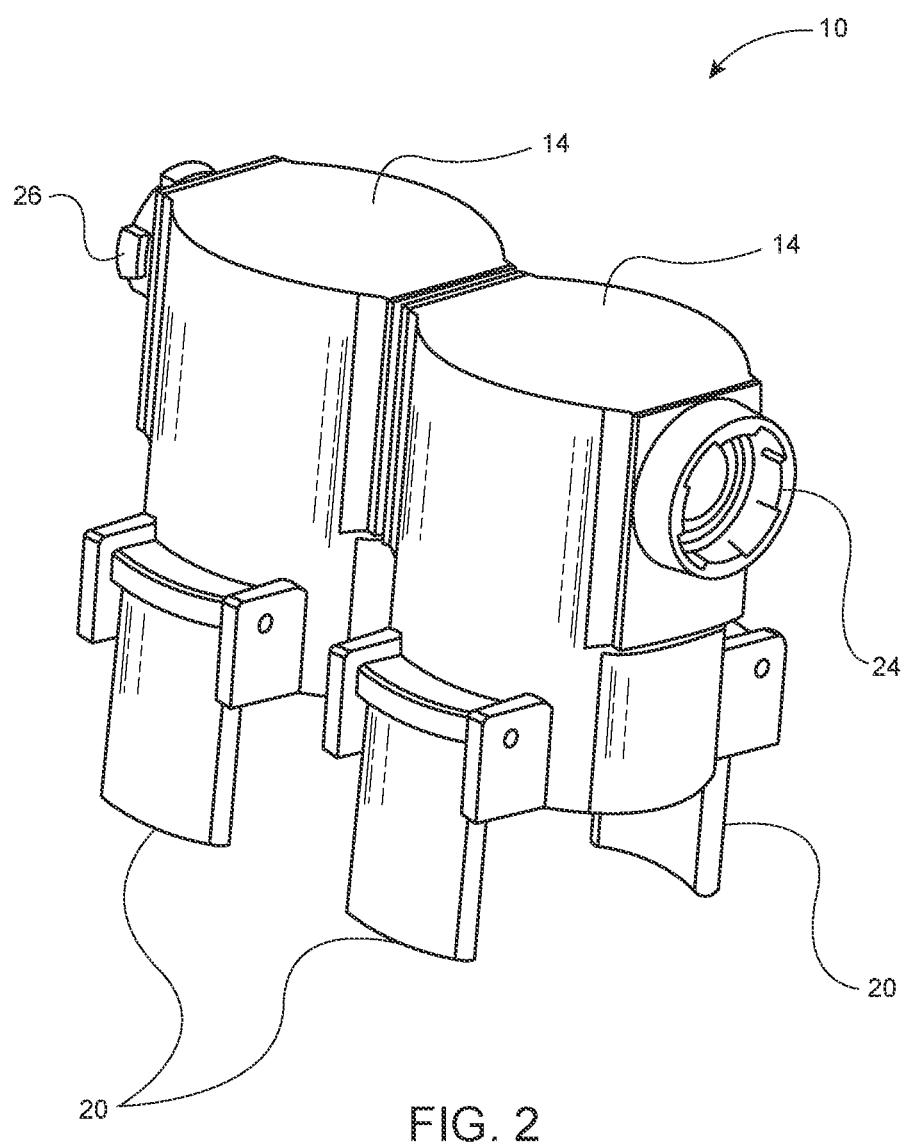
FIG. 2 is perspective view of two filter heads mated together in accordance with an embodiment of the present disclosure.

FIG. 2 is perspective view of two filter heads 14 mated together in accordance with an embodiment of the present disclosure. As shown in FIG. 2, the heads 14 can be secured one to another. In this manner, a series of filtering operations can be performed by the filter system 10. For example, a first filter housing 12 may include a first filter cartridge 18 configured to filter particles from the fluid flow, a second filter housing 12 may include a second filter cartridge 18 configured to coalesce entrained droplets from the fluid flow, and a third filter housing 12 may include a third filter cartridge 18 configured to filter vapors from the fluid flow.

Figure 3:
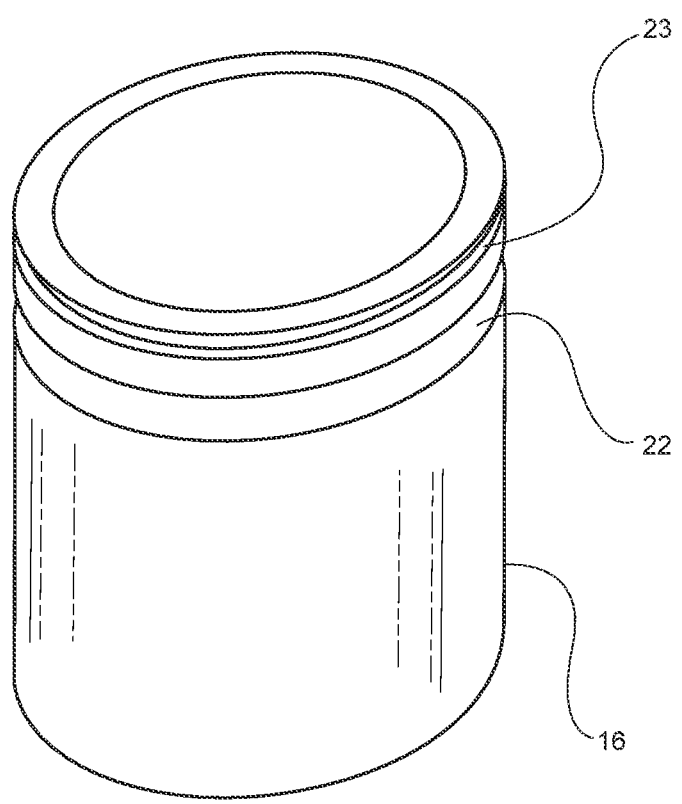
FIG. 3 is a perspective view of a filter bowl in accordance with an embodiment of the present disclosure.

FIG. 3 is a perspective view of the filter bowl 16 in accordance with an embodiment of the present disclosure. As shown in FIG. 3, the bowl 16 includes the annular groove 22 to accept the levers 20 shown in FIG. 1. In addition, the bowl 16 may include an O-ring seat 23. In some embodiments, the bowl 16 may be elliptical rather than cylindrical. In a particular example, the bowl 16 may be defined by a 30° ellipse.

Figure 4:
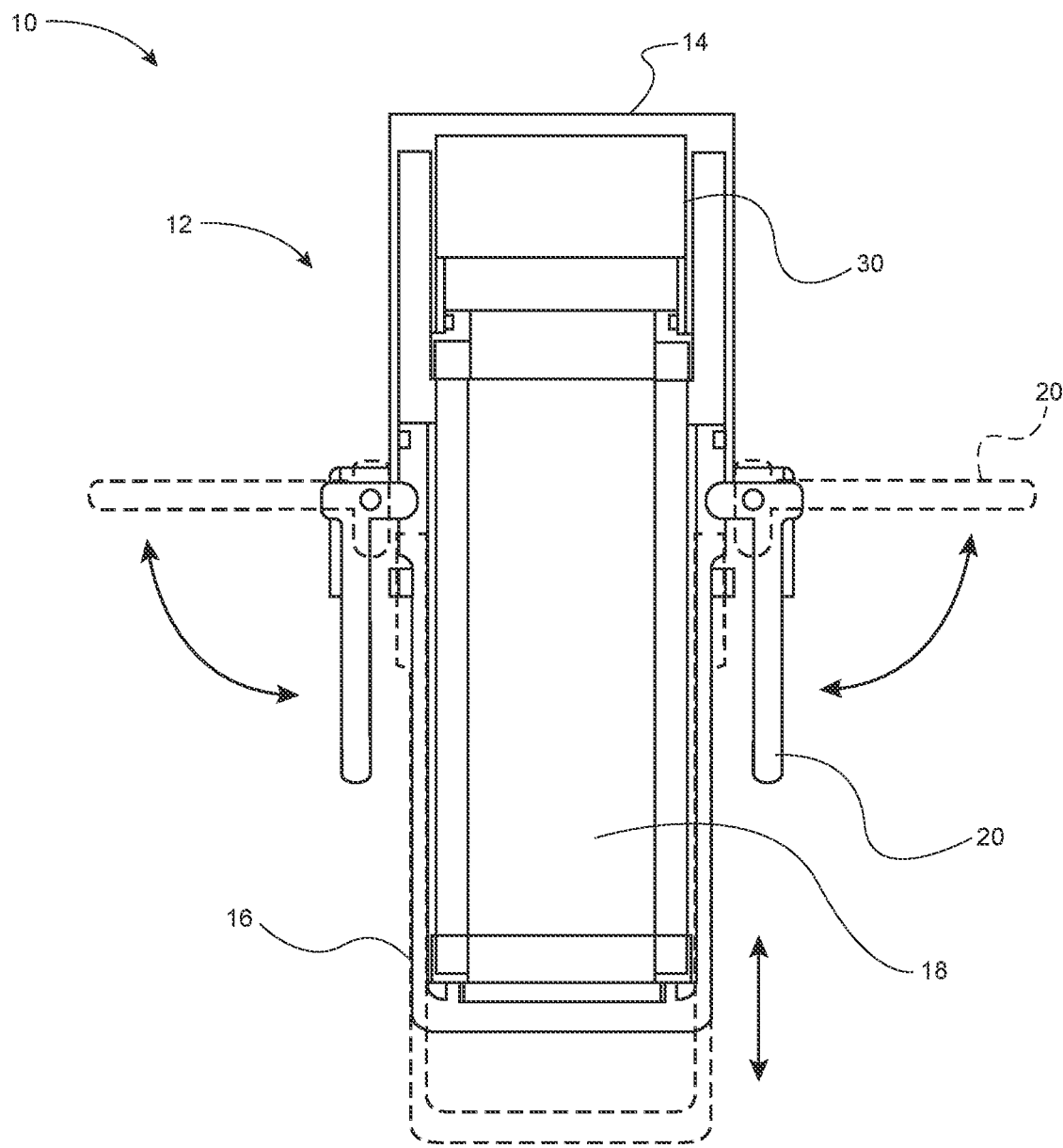
FIG. 4 is a cross-sectional view through a plane of the filter housing showing the levers securing the bowl to the head in accordance with an embodiment of the present disclosure.

FIG. 4 is a cross-sectional view through a plane of the filter housing 12 showing the levers 20 securing the bowl 16 to the head 14 in accordance with an embodiment of the present disclosure. As shown in FIG. 4, the arms engaging the annular groove 22 are relatively short in comparison to the arms engaged by the user which provides the user with a corresponding mechanical advantage to seat and secure the bowl 16 as well as a corresponding mechanical advantage when removing the bowl 16 from the head 14.

Figure 5:
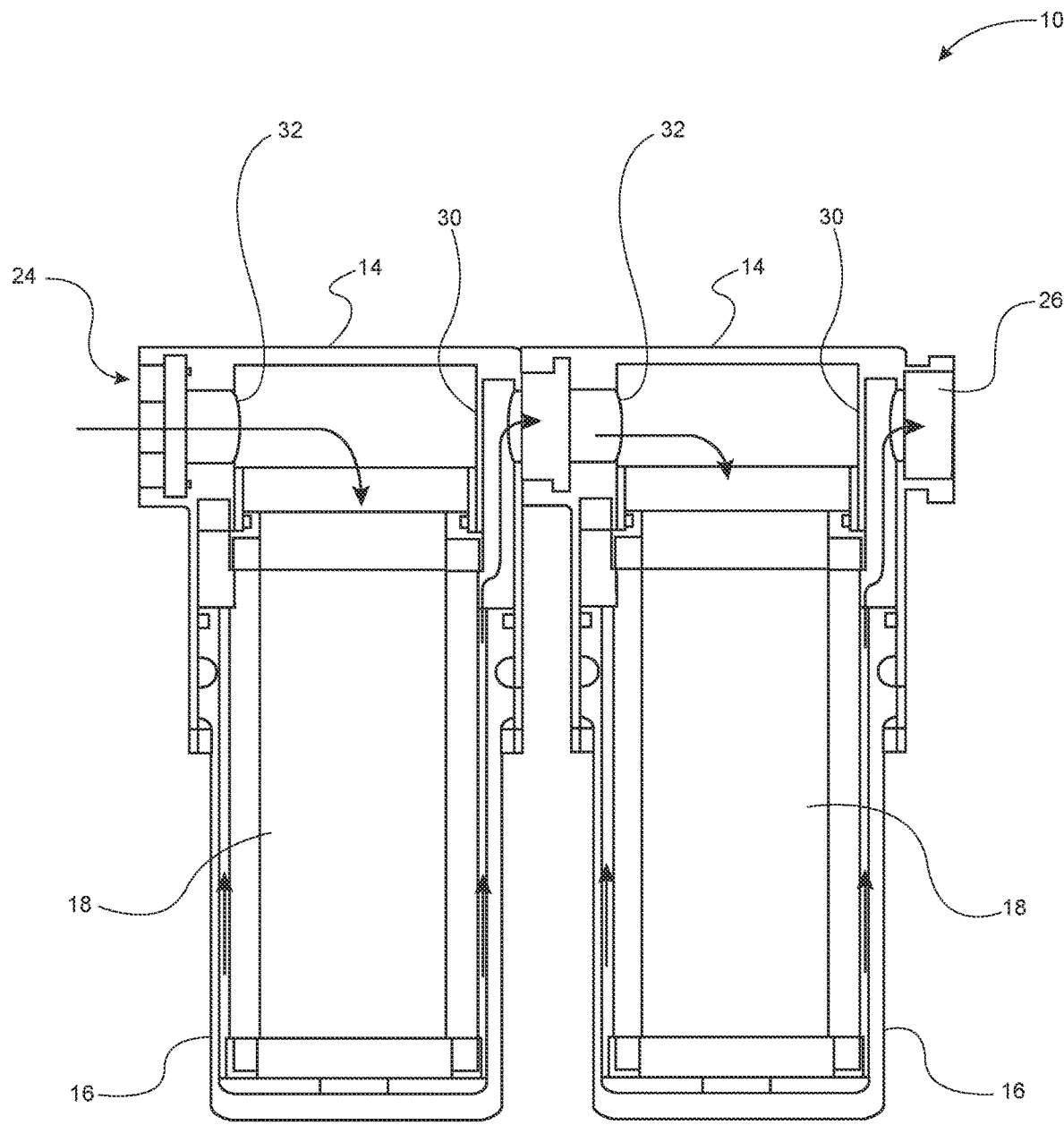
FIG. 5 is a cross-sectional view taken along line A-A of FIG. 1 showing flow of a fluid entering a first filter housing, being filtered and flowing into a second filter housing in accordance with an embodiment of the present disclosure.

FIG. 5 is cross-sectional view A-A showing flow of a fluid entering a first filter housing 12, being filtered and flowing into a second filter housing 12 in accordance with an embodiment of the present disclosure. As shown in FIG. 5, the first filter housing 12 is directly connected to the second filter housing 12. Also shown in FIG. 5, the head 14 includes a baffle 30 with a baffle inlet 32 to allow the flow of fluid into the head 14. The baffle 30 is sealed to a top rim of the filter cartridge via an O-ring, for example. In this manner, fluid entering the first filter housing enters via the inlet 24 into the head 14 and then flow down into the filter cartridge 18 where the fluid is filtered as it passes through the filter media. Filtered fluid then flows back up along the inside of the bowl 16 and out the outlet 26 where the process is repeated in the second filter housing 12. As described herein, depending upon the type of filter media making up the filter cartridge, different contaminants are preferentially removed from the fluid flow.

Figure 6:
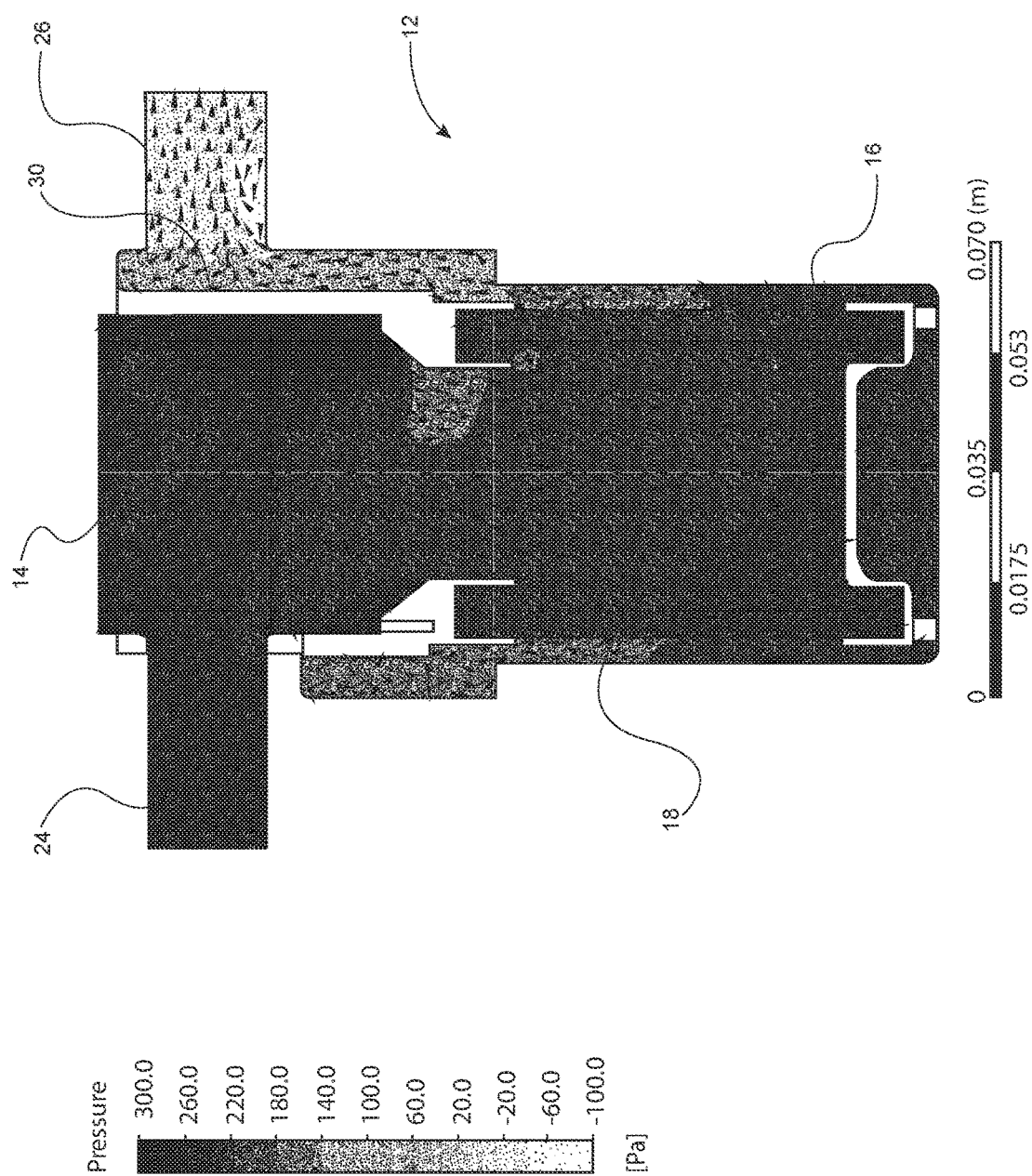
FIG. 6 is a cross-sectional view taken along line A-A of FIG. 1 showing fluid pressure through the filter housing in accordance with an embodiment of the present disclosure.

FIG. 6 is a cross-sectional view A-A of fluid pressure through the filter housing 12 in accordance with an embodiment of the present disclosure. As shown in FIG. 6, fluid flowing into the head 14 strikes the baffle 30 and then disperses down and through the filter cartridge. Importantly, the pressure of the fluid exiting the outlet 26 drops very little in comparison to the pressure of the fluid entering the inlet 24. In the example shown, the change in pressure ("$\Delta P$") from the inlet 24 to the outlet 26 is about 300 Pa. This relatively small $\Delta P$ in comparison to conventional filter housings may be at least partially due to elliptical shape of the housing 12 which improves fluid flow through the filter housing.

Figure 7:
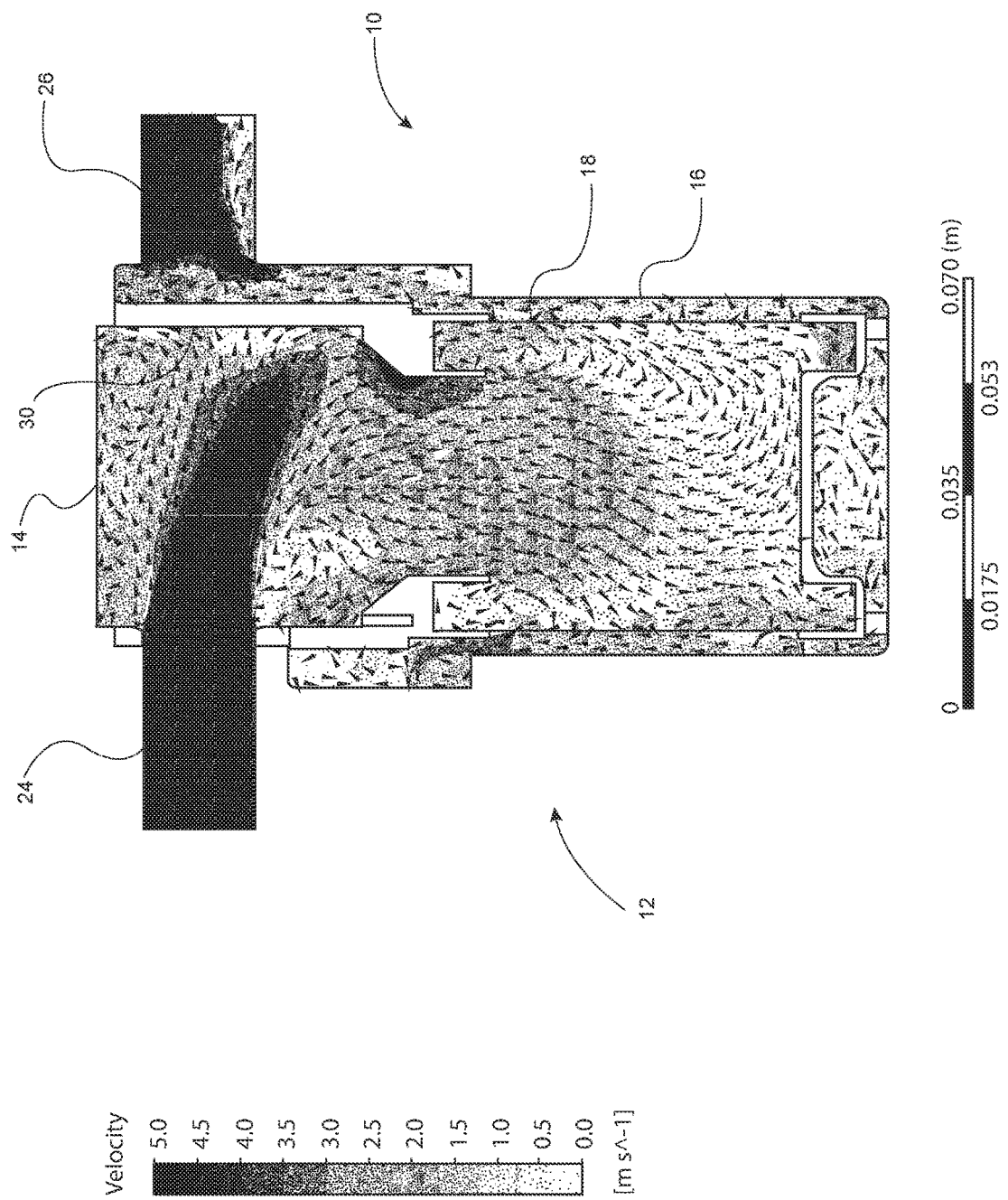
FIG. 7 is a cross-sectional view taken along line A-A of FIG. 1 showing fluid velocity through the filter housing in accordance with an embodiment of the present disclosure.

FIG. 7 is a cross-sectional view A-A of fluid velocity through the filter housing in accordance with an embodiment of the present disclosure. Again as shown in FIG. 7, fluid flowing into the head 14 strikes the baffle 30 and then disperses down and through the filter cartridge. Importantly, the velocity of the fluid exiting the outlet 26 reduced very little in comparison to the velocity of the fluid entering the inlet 24.

Figure 8:
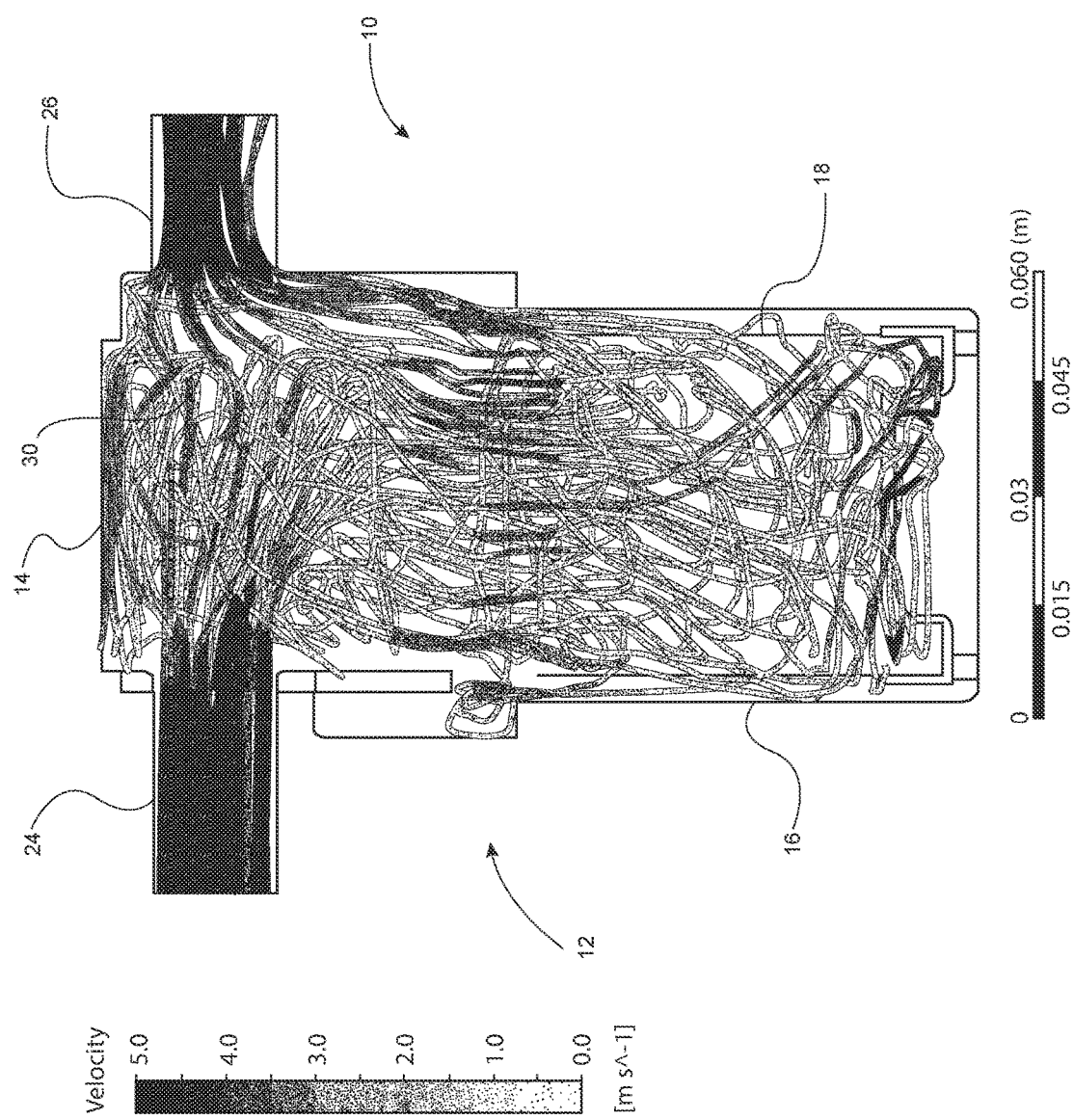
FIG. 8 is a cross-sectional view taken along line A-A of FIG. 1 showing a streamline fluid velocity through the filter housing in accordance with an embodiment of the present disclosure.

FIG. 8 is a cross-sectional view A-A of a streamline fluid velocity through the filter housing 12 in accordance with an embodiment of the present disclosure. As shown in FIG. 8, fluid flowing into the head 14 strikes the baffle 30 and then flows down and through the filter cartridge. Fluid flowing up along the bowl 16 and below the outlet 26 flows smoothly up and out through the outlet 26 whereas fluid flowing up the bowl 16 and below the inlet is directed around the filter housing 12 outside of the filter cartridge 18 and toward the outlet 26. Importantly, the flow of the fluid through the housing 12 and exiting the outlet 26 is organized with little or no turbulence. This relatively smooth flow of fluid in comparison to conventional filter housings may be at least partially due to elliptical shape of the housing 12 which improves fluid flow through the filter housing.

Figure 9:
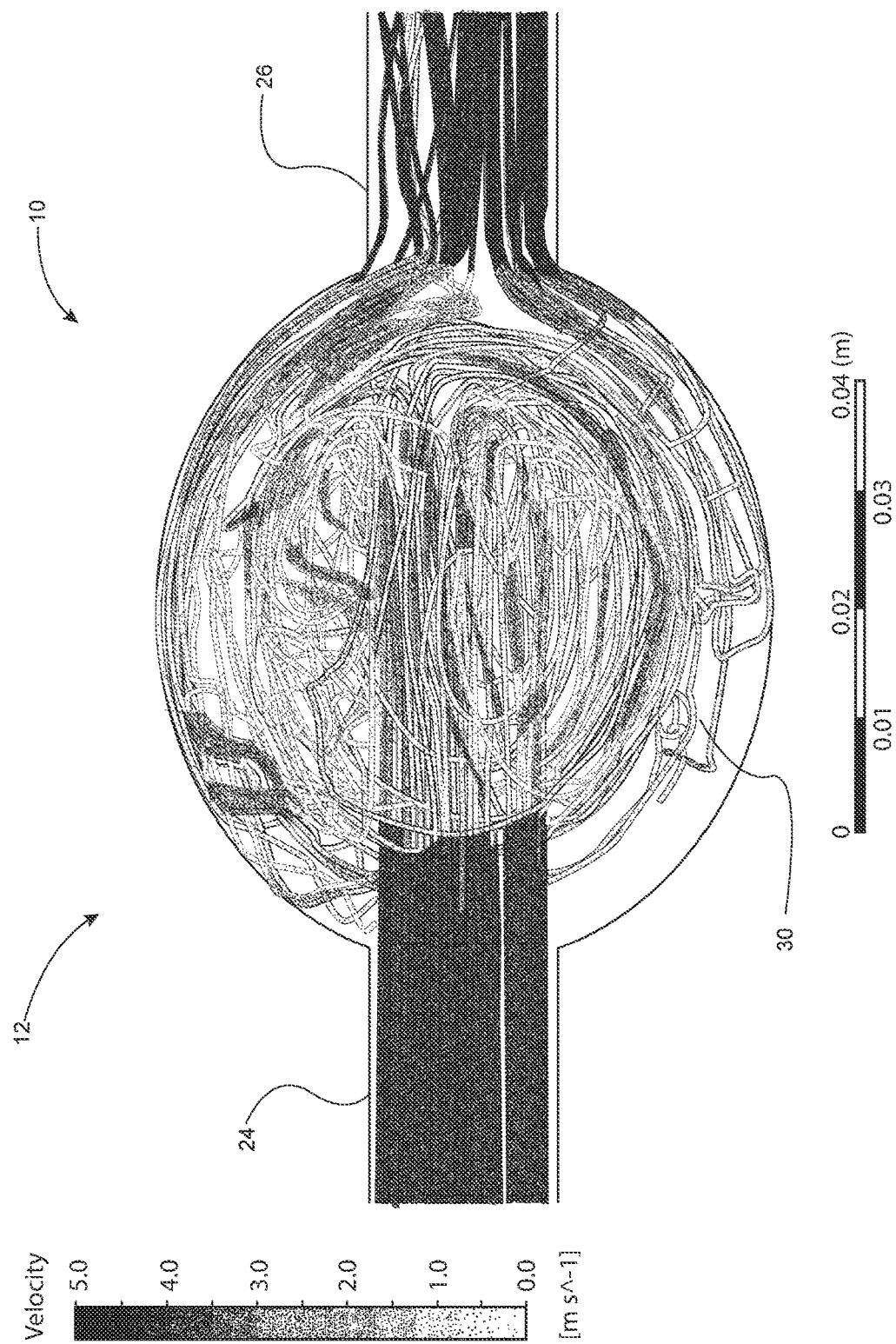
FIG. 9 is a cross-sectional view taken along line B-B of FIG. 1 showing a streamline fluid velocity through the filter housing in accordance with an embodiment of the present disclosure.

FIG. 9 is a cross-sectional view B-B of a streamline fluid velocity through the filter housing 12 in accordance with an embodiment of the present disclosure. As shown in FIG. 9, fluid flowing into the head 14 strikes the baffle 30 and then flows down and through the filter cartridge. Fluid is shown flowing up and around the head 14 outside the baffle 30 and then flowing smoothly out through the outlet 26. Importantly, the flow of the fluid through the housing 12 and exiting the outlet 26 is organized with little or no turbulence. This relatively smooth flow of fluid in comparison to conventional filter housings may be at least partially due to elliptical shape of the housing 12 which improves fluid flow through the filter housing.

Figure 10:
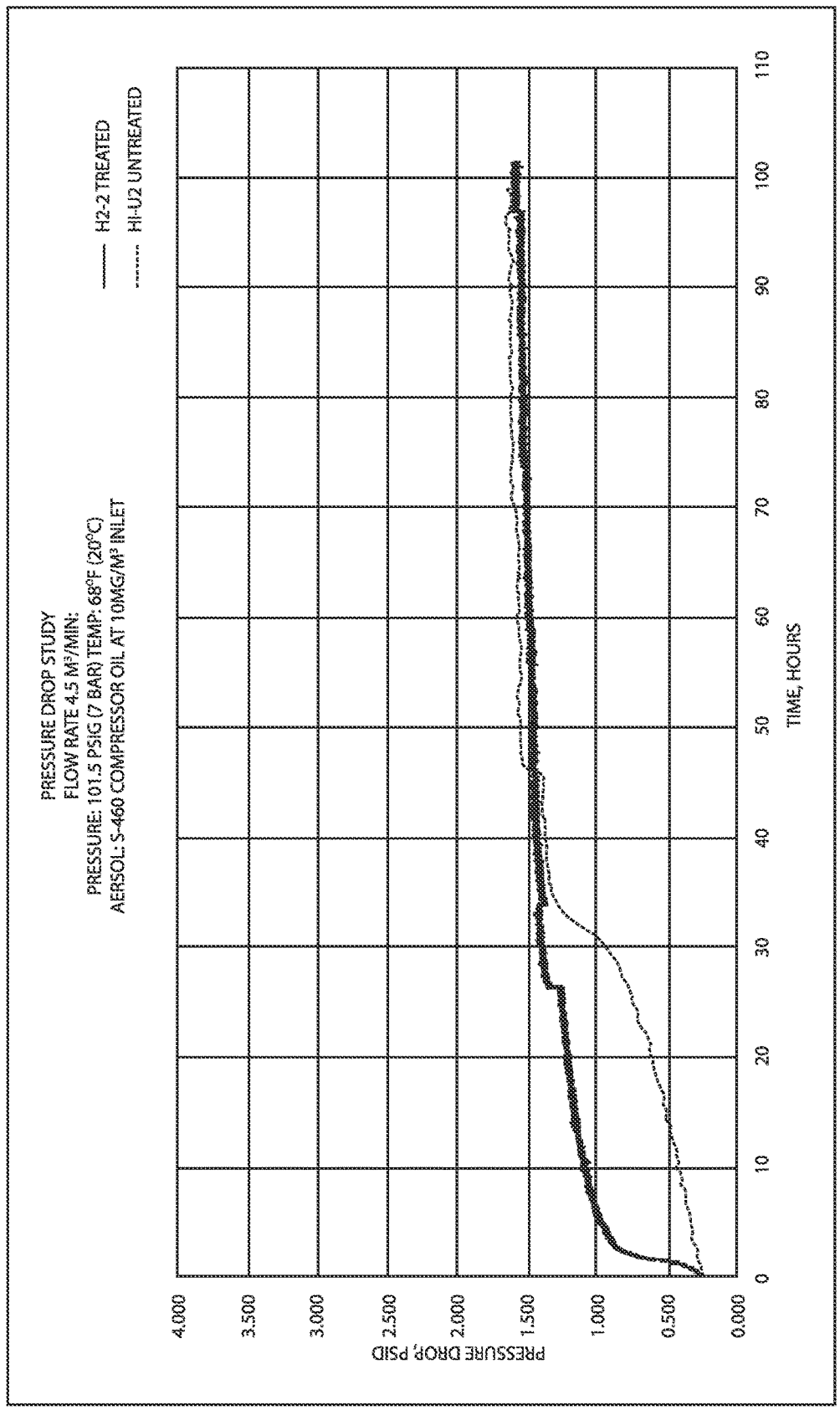
FIG. 10 is a graph of pressure drop across a filter cartridge over time in accordance with an embodiment of the present disclosure.

FIG. 10 is a graph of pressure drop across the filter cartridge 18 with different types of filter media over time in accordance with an embodiment of the present disclosure. As described herein, the filter cartridge 18 utilizes any suitable filter media and that filter media may be selected based on the fluid being filtered, the debris being filtered, flow rates, and the like. A particular filter task is to trap and coalesce entrained oil droplets in a flow of air.

Purification of compressed air is necessary for clean environments and processing of industrial, food & beverage and pharmaceutical manufacture. Air compressors generate aerosols consisting of lubrication oils and other particulates from debris coming from rotating parts or solid contaminants inherent in piping systems. Oil aerosols are the most difficult to remove as they may be in the form of sub-micron size droplets that require very fine fibers to capture.

In common applications compressed air downstream of the compressor is treated with a series of filters that may start with a particulate filter, followed by a coalescer and in some cases an adsorbing filter to remove oil vapors. Coalescing filters work by capturing sub-micron droplets onto fine fibers and merging with other incoming droplets until a bead is large enough to overcome the interfacial tension between the oil and the fiber. When the bead increases in mass it breaks away from the fiber and settles via gravity and capillary forces to the bottom of a vertical fiber mat. The collected oil then drains from the mat into a sump or oil recovery circuit.

In many applications a large pore drain layer is applied to the downstream side of the fiber mat to support collection and drainage of oil when droplets accumulate in the upper portions of the vertical mat. The need for improvement is based on the interaction of oil aerosol particles with fiber mats and coalescing filter performance. As an inventory oil is collected in the mat, the pore openings become occluded by the same oil thereby increasing restriction to air flow. The occluded mat results in (a) increased cost in energy to maintain a proscribed air flow and (b) as more pores are occluded local air speed increases which can cause captured droplets to break away from the fiber surface and become re-entrained in the air flow. A filter media described herein is configured to minimize the amount of bead growth to accelerate drainage from the fiber mat, leaving fewer occluded pores to reduce restricted air flow and minimize entrainment.

With the objective for improving coalescer performance by draining oil from the fiber mat with minimal occlusion, there are two schools of thought. One is by imparting an oil repellant surface treatment to the fibers and sometimes referred to as an "oleophobic" surface and the other is through an oil absorbent surface treatment or imparting an "oleophyllic" surface treatment.

Conventional coalescing fiber mats are manufactured from glass fibers which utilize fibers with diameters between 2-10 microns in a deep bed mat ranging in thickness from ⅛" to 2". While there are surface treatments available on the market including fluorocarbons along with dimers and other monomers. The surfaces of extruded glass fibers are smooth with high surface energies which make binding dedicated coatings difficult and are usually temporary, wearing away due to flow erosion. Fluorocarbons are the preferred treatments and were most effective with C8 chains. Unfortunately C8 carbons were banned due to health effects with carbon chains no greater than C6 allowed by regulating agencies. C6 chained fluorocarbons are not as effective as repellants for oils.

In the present disclosure for coalescing filters, the coalescing filter media includes treatment with low pressure plasma activation of the surface. Surface activation generally means a roughening of the fiber surface creating nanoscale splits along the surface. An oleophobic treatment was imparted by using a C6 fluorocarbon gas exposure just downstream from the plasma exposure. In addition, the coalescing filter media includes a coalescing mat ranging from 40 mils to 50 mils in thickness but with fiber sizes in the range of ≤1.5 microns providing large pore volume for low air flow restriction with fine fibers to capture sub-micron particles.

The oleophobic treatment was performed as follows. An Aurora R2R (Roll to roll) low pressure plasma system was configured to deliver 1000 watts at 208 VAC and 5 amp of current. A 24" roll of coalescing filter media (40-50 mils thick with fiber size ≤1.5 microns) was fed at 1 meter/minute feed speed through the plasma treatment and then subjected to 250-1000 Standard cubic centimeter ("scc")/minute of dry fluorocarbon gas.

Wettability tests were performed on the coalescing filter media using a series of reagents with decreasing surface tensions to scale the wettability of the treatment. Wettability was performed using a standard 3M® kit specifically for this use. Running through a series of trials with varying plasma energies a high repellency (low wettability) value was obtained.

A series of coalescing filter cartridges 18 were manufactured and tested in 100-hour intervals and the results of these tests are shown in FIG. 10. As shown in FIG. 10, the pressure drop across the filter cartridge 18 with the coalescing filter media according to embodiments of the invention was less than when used with conventional filter media. While the onset of drainage did not occur significantly sooner than untreated webs, the pressure rise curve due to collection of oil over time was flatter than untreated web. This was indication that once wetting began, drainage did occur at a faster rate than untreated web extending the service life of the coalescer over competitors performance.

An unexpected improvement in the performance of the coalescing filter media according to embodiments of the invention in comparison to conventional filter media was observed during the series of 100-hour exposure tests. Residual oil was collected downstream of the test element using a capture filter system, viz. any entrained oil mist was collected on a high efficiency patch and the amount of oil collected proportioned to volume of air flow was measured. According to industry and product standards a certain level of oil penetration is permitted and was seen at very low levels form the conventional filter media mats. However, on the coalescing filter media treated according to embodiments of the invention, there was no downstream oil collected in our catch filter system. While no filter is ever 100% efficient the amount of oil that may have penetrated the filter element was below the level of detection methods.

Figure 11:
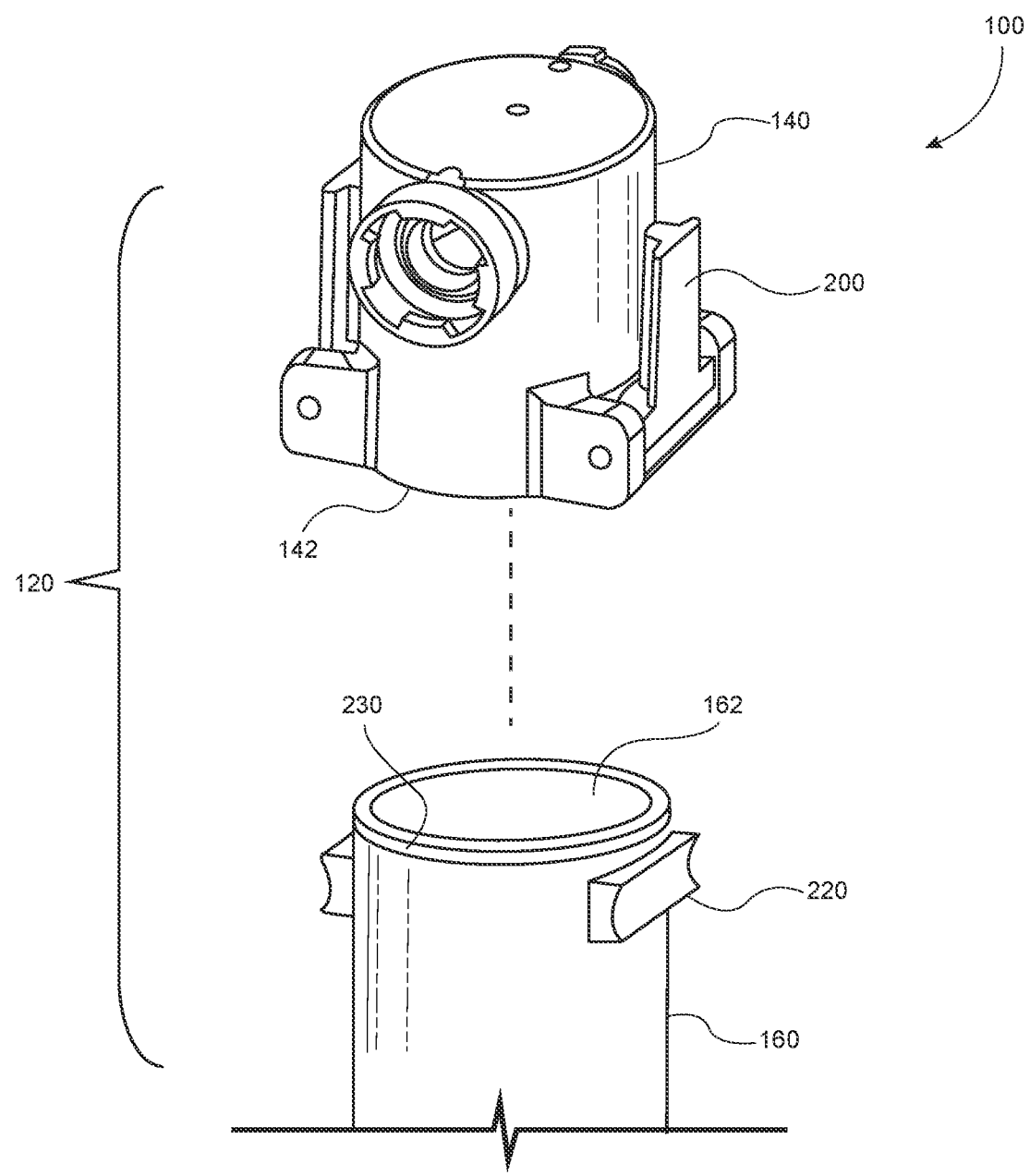
FIG. 11 is an exploded perspective view of a filter system in in accordance with another embodiment of the present disclosure.

FIG. 11 is a perspective view of a filter system 100 in accordance with another embodiment of the invention. As shown in FIG. 11, the filter system 100 includes a filter housing 120 having a head 140 and a bowl 160 configured to house a filter cartridge, such as the filter cartridge 18 previously described above. The head 140 may be formed of die-cast aluminum and includes a pair of levers 200 at or near an open end 142 of the head. The pair of levers 200 are configured to releasably secure the head 140 to the bowl 160. The bowl 160 includes a pair of localized straight grooves 220 disposed on or protruding from an outer surface of the bowl 160 at or near an open end 162 of the bowl. When assembled, the open end 142 of the head 140 receives the open end 162 of the bowl 160. An annular O-ring seat 230 may also be provided on the outer surface of the bowl 160 at or near the open end 162 of the bowl. The O-ring seat 230 is configured to receive an elastomeric O-ring 280 or other elastomeric washer in order create a fluid-tight seal to prevent fluid within the housing 120 from leaking out between the head and the bowl. Further, each lever 200 of the head 140 is configured to releasably engage the respective localized straight groove 220 disposed on or protruding from the outer surface of the bowl 160 in order to selectively lock and unlock the head to the bowl, as will be discussed in further detail below.

Figure 13:
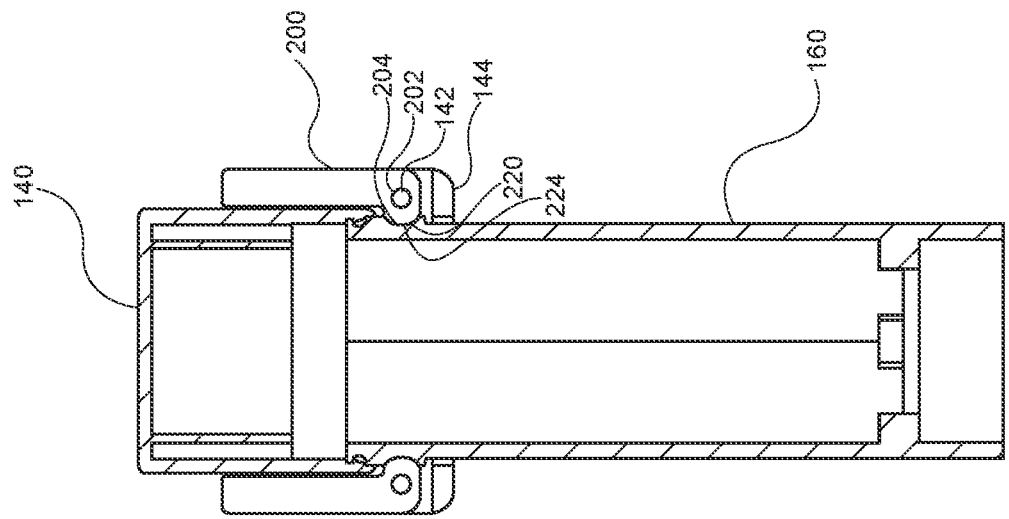
FIG. 13 is a cross-sectional view taken along line C-C of FIG. 12 showing the filter system in the locked configuration.
Figure 12:
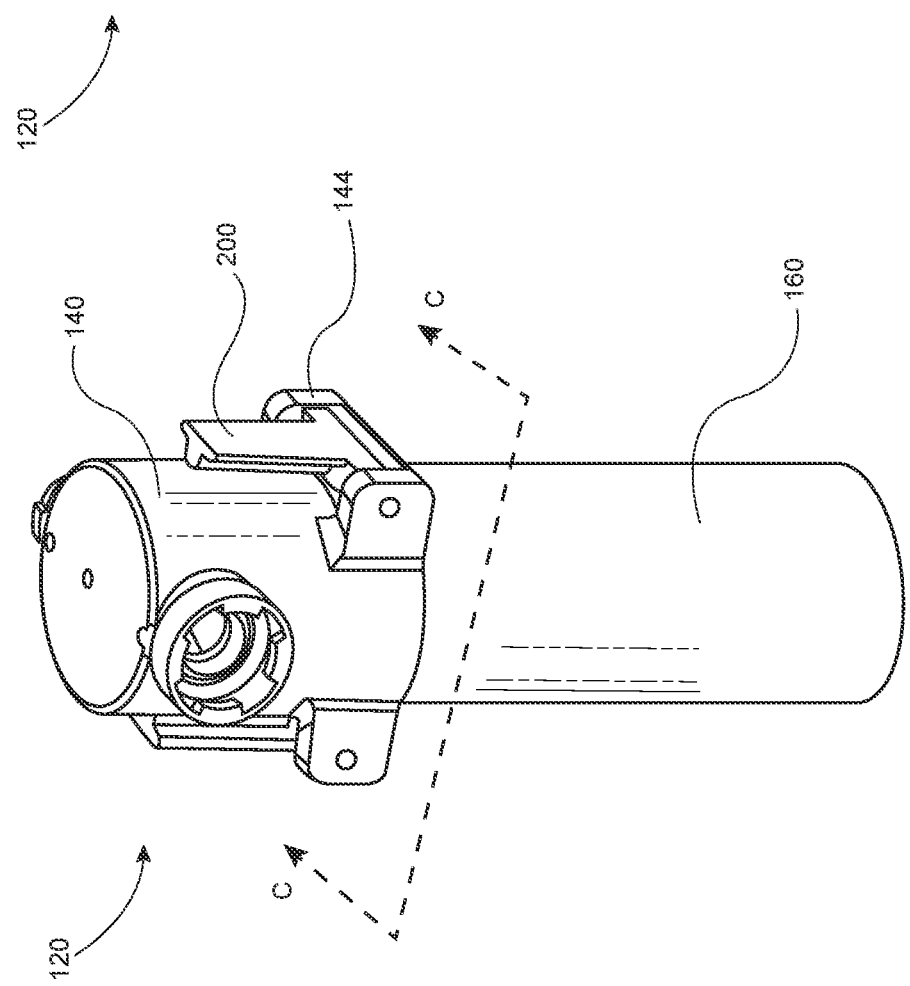
FIG. 12 is a perspective view of the filter system shown in FIG. 11 in a locked configuration.

As depicted in FIGS. 12 and 13, the filter housing 120 is in a locked configuration in which the head 140 is secured to the bowl 160. In particular, each lever 200 is rotatably coupled to the head 140, such that when the open end 162 of the bowl 160 is inserted into the open end 142 of the head 140, the lever 200 may be rotated upwardly to a first position in which the lever is pressed in a direction toward the head in order to assume the locked configuration between the head and the bowl. In some implementations, each lever 200 includes a bore 202 configured to receive a rod 142 attached to a wing portion 144 protruding laterally from the head 140, such that the lever is operable to rotate about the rod to selectively move between the locked configuration and an unlocked configuration. In some implementations, the lever 200 may have a grip portion, such as a textured surface, to assist a user in gripping and manipulating the lever.

As the lever 200 is rotated upwardly toward the head 140 to assume the locked configuration, a convex cam surface 204 of the lever is urged into contact with a corresponding concave bearing surface 224 of the localized straight groove 220, as shown in FIG. 13. As a result, when the lever 200 is pressed up against a side of the head 140, the cam surface 204 of the lever 200 is correspondingly pressed tightly against the bearing surface 224 of the localized straight groove 220 on the bowl, thus securely clamping the head to the bowl in the locked configuration. During operation, fluid flow through the filter housing will generally operate at approximately 100 psi, however, the filter housing 120 is able to handle fluid flow over 1,000 psi in this locked configuration without causing the cam surface 204 of the lever 200 to disengage from the bearing surface 224 of the localized straight groove 220. Moreover, the protruding localized straight groove 220 on the bowl 160 allows the lever 200 to press directly into the bearing surface 224, which eliminates excess stress from spreading around a periphery of the bowl.

The cam surface 204 of the lever 200 is further operable to provide a mechanical advantage to a user so that the bowl 160 can be drawn tightly into the head 140 for a sealing arrangement as the lever is rotated upwardly toward the head to achieve the locked configuration. The cam surface 204 of the lever 200 is also operable to provide a mechanical advantage to the user so that if the bowl 160 is pulled or urged away from the head 140 when in the locked configuration, the each lever 200 is correspondingly pulled in tighter against the head 140, thus ensuring the locked configuration of the levers do not accidentally disengage from the corresponding localized straight grooves 220.

Figure 18:
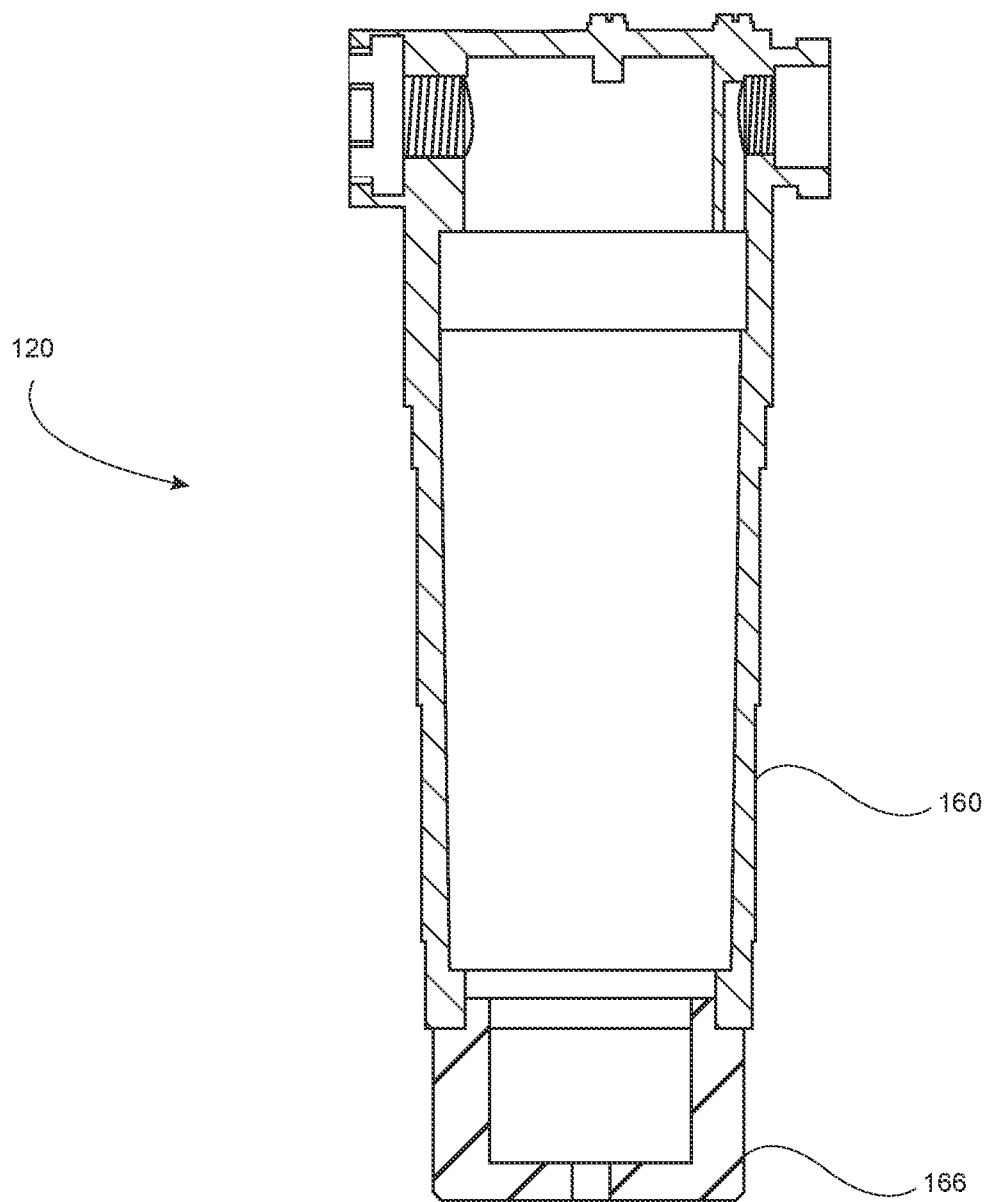
FIG. 18 is a cross-sectional view of a filter housing having a removable cap.

In some implementations, a drain valve may be provided inside a bottom portion of the bowl 160. The bottom portion of the bowl may include a removable cap in order to access the drain valve for maintenance. According to some aspects, the cap and the bottom portion of the bowl may include complementary bayonet-type locks which allow a user to easily and quickly detach the cap from the bowl in order to gain access to the drain valve inside the bottom of the bowl so that it can be cleaned out in the event the drain valve becomes clogged. The complementary bayonet-type locks similarly allow quick and easy attachment of the cap to the bottom portion of the bowl once the valve drain is cleaned. For instance, such a bayonet-style lock on the cap may be twisted a first direction to unlock the cap from the bowl. The bayonet-style lock on the cap may be twisted a second direction to lock the cap back to the bowl. An example of a filter housing 120 having a bowl 160 with a removable cap 166 is shown in FIG. 18.

Figure 14:
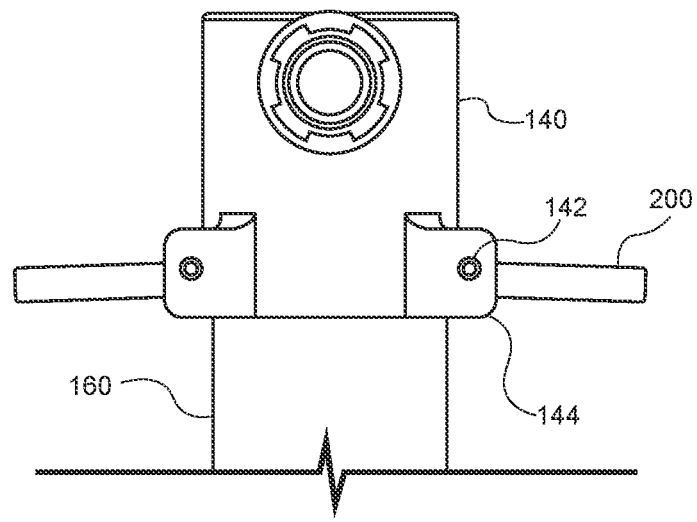
FIG. 14 is a partial front view of the filter system shown in FIG. 11 in an unlocked configuration.
Figure 15:
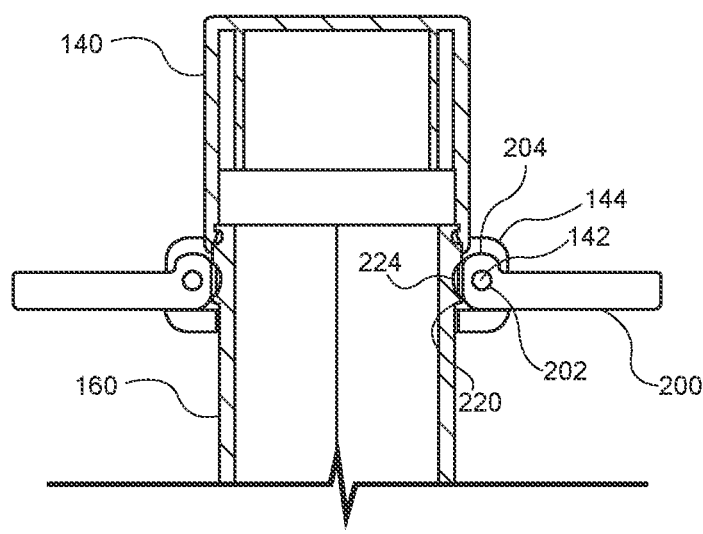
FIG. 15 is a cross-sectional view of the filter system shown in FIG. 14.

Turning to FIGS. 14 and 15, the levers 200 rotatably attached to the head 140 are further configured to disengage the corresponding localized straight grooves 220 on the bowl so that the filter housing 120 may assume the unlocked configuration. Once unlocked, the bowl may be withdrawn from the head so that the filter housing may be serviced and the filter cartridge replaced. In particular, when the lever 200 is rotated downwardly about the rod 142 toward a direction away from the head 140, the convex cam surface 204 of the lever is correspondingly rotated out of contact with the concave bearing surface 224 of the localized straight groove 220 protruding from the bowl 160, thus causing the filter housing to assume the unlocked configuration. In this unlocked configuration, the lever 200 does not contact the bearing surface 224 of the localized straight groove 220, thus allowing the bowl 160 to be easily and quickly pulled out of head 140. Accordingly, the bowl 160 is disengaged from the head 140 by rotating each lever handle 200 by approximately 90°, thus releasing the filter bowl. When reinstalled, the bowl is pushed up into the head until each radiused groove 220 aligns with the corresponding cam surfaces 224 on the levers. The bowl is then secured to the head by rotating the levers back by approximately 90° to the up position.

Figure 16:
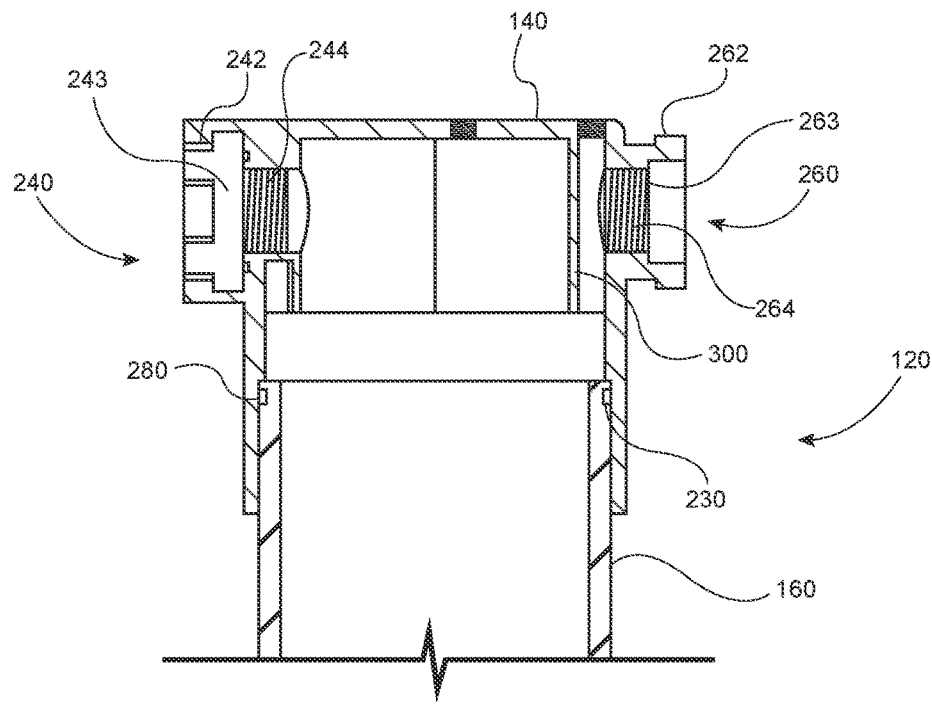
FIG. 16 is a partial side cross-sectional view of the filter system shown in FIG. 11.

Referring to FIG. 16, the head 140 includes an inlet 240 and an outlet 260 for the fluid flow. Specifically, the inlet 240 is configured to allow a flow of fluid into the filter housing 120, and the outlet 260 is configured to allow a flow of fluid out of the filter housing 120. An elastomeric O-ring 280 or other elastomeric washer is received in the O-ring seat 230 to form a fluid-tight seal for preventing fluid from leaking out of the filter housing. The inlet 240 may have one or both of a bayonet-style fitting 242 and an inlet threaded pipe fitting 244, such as a National Pipe Thread (NPT). Similarly, the outlet 260 may have one or both of a bayonet-style fitting 262 and an outlet threaded pipe fitting 264, such as an NPT.

In some implementations, the bayonet-style fittings may include one or more lugs. For example, the inlet 240 may include a four lug bayonet-style fitting 242, and an inner bore 243 having an inlet threaded pipe fitting 244. In this manner, the inlet 240 may be secured to a supply pipe via the pipe fitting 244 or secured to the outlet 260 of another filter housing 120 or other device with a matching bayonet-style fitting. Similarly, the outlet 260 may have include a four lug bayonet-style fitting 262 configured to engage a corresponding bayonet-style fitting of an inlet of another filter housing, and an inner bore 263 having an outlet threaded pipe fitting 264 for securing to a threaded pipe. In some implementations, the bayonet-style fitting 242 at the inlet 240 may be a female fitting, and the bayonet-style fitting 262 at the outlet 260 may be a male fitting. In other implementations, the bayonet-style fitting 242 at the inlet 240 may be a male fitting and the bayonet-style fitting 262 at the outlet 260 may be a female fitting.

Furthermore, as shown in FIG. 16, the head 140 includes a baffle 300 protruding from an interior top surface of the head. In operation, fluid flows into the filter housing 120 through the inlet 240 and then flows through the filter cartridge disposed within the housing, thus filtering the fluid before exiting the housing through the outlet 260. Stated another way, fluid entering the filter housing enters via the inlet 240 into the head 140 and then flows down into the filter cartridge where the fluid is filtered as it passes through the filter media. Filtered fluid then flows back up along the inside of the bowl 160 and out of the outlet 260. As previously described above, depending upon the type of filter media making up the filter cartridge, different contaminants are preferentially removed from the fluid flow. Fluid flowing into the head 140 strikes the baffle 300 and then disperses down and through the filter cartridge.

Figure 19:
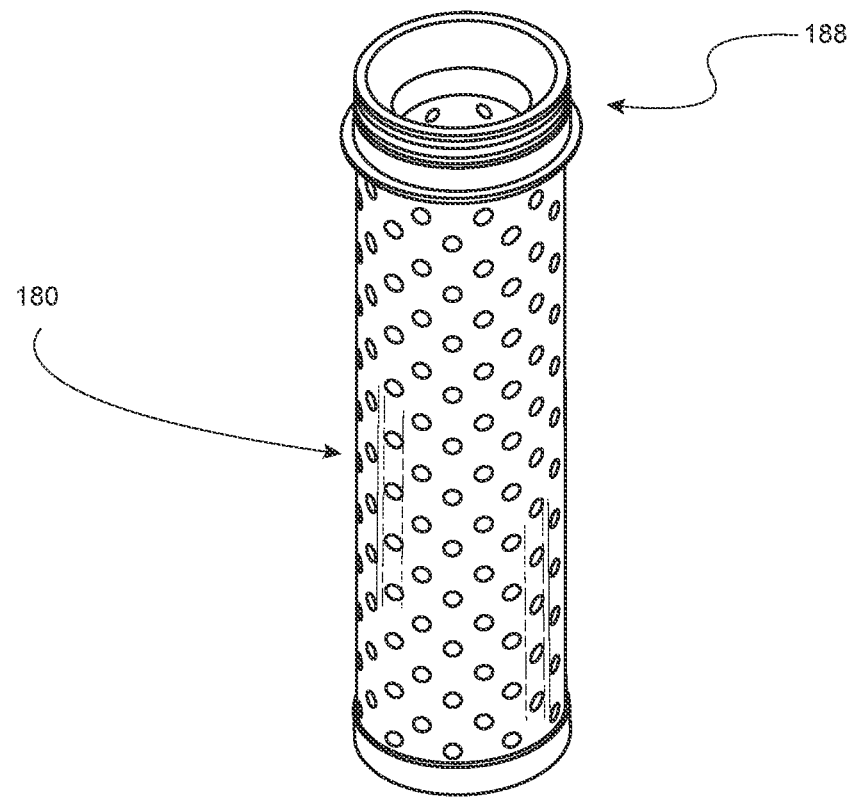
FIG. 19 is a perspective view of an implementation of a filter cartridge according to the present disclosure.
Figure 20:
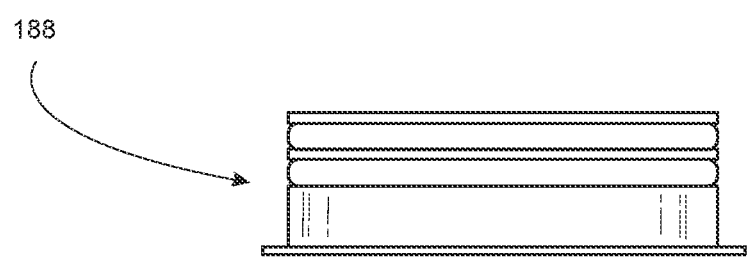
FIG. 20 is a side elevational view of a filter adaptor for a filter cartridge according to the present disclosure.

In some implementations, a filter cartridge adaptor 188 as shown in FIGS. 19 and 20 may be provided to secure the filter cartridge 180 within the filter head. For instance, the adaptor may include a double O-ring seal configured to fit within and engage the filter head. Other types of adaptors may be provided, including those having grooves, snap-locking fingers, or different shaped ellipses, amongst others. In particular, the double O-ring seal is configured to fit on top of the filter cartridge and form an interference fit inside of the filter head, i.e., in a cavity inside the head.

In some implementations, the head, the bowl, and the filter cartridge may be cylindrically shaped. In other implementations, such as the filter housing shown in FIGS. 14-17, the head 140, the bowl 160, and the filter cartridge may be elliptically shaped. In particular, these components may be shaped as a 60° ellipse having a constant ratio (where the ratio of the minor axis to the major axis of the ellipse is equal to the sine of 60°). In some implementations, the elliptical shape of the head, the bowl and the filter cartridge may be in the range of 45°-75°, and preferably 60°. Due to the elongated dimension of the major axis of the elliptically shaped filter housing, the pressure drop of the fluid flow between the inlet and the outlet is minimized. Moreover, the elliptical shape also results in a better flow distribution through the filter housing, thus allowing improved utilization of the filter media of the cartridge to capture contaminants. Typically, fluid that flows through filter media that includes a multitude of pores becomes laminar since flow through a fabric/textile divides the fluid flow into the fine pores of the media. As the fluid then exits the filter media, it recombines and becomes more turbulent. The elliptically-shaped components of the filter housing 120 cause the flow of fluid therethrough and exiting from the outlet 260 to be organized with little or no turbulence, thus resulting a smooth flow. Moreover, the elliptical shaped filter housing also helps maintain the fluid velocity at the inlet to be approximately the same as the fluid velocity at the outlet.

Figure 17:
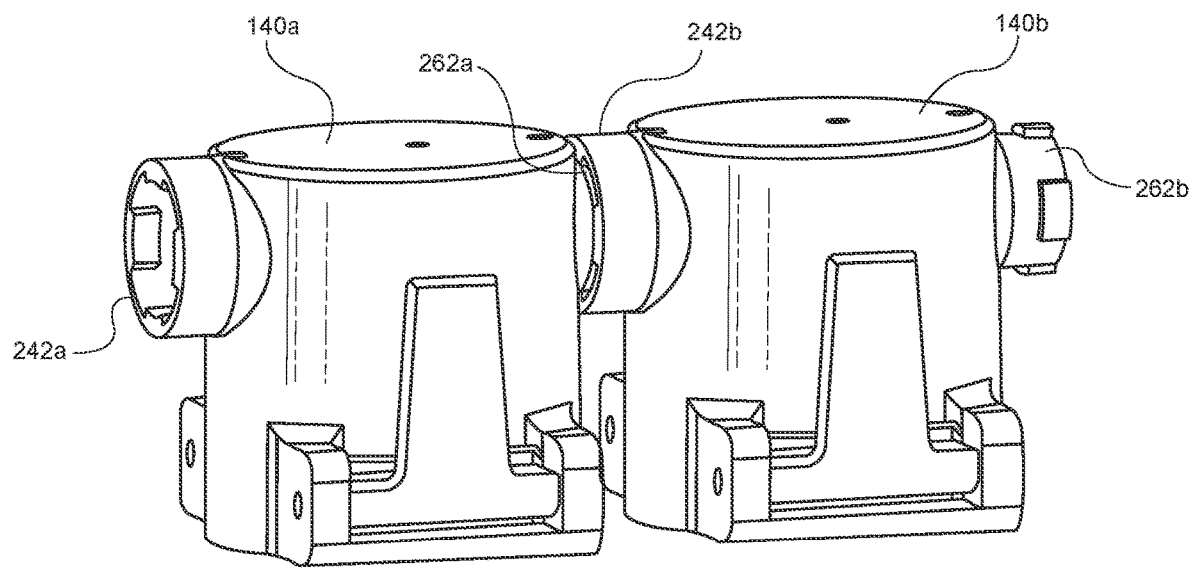
FIG. 17 is a perspective view of two filter heads mated together in accordance with another embodiment of the present disclosure.

As previously described above, two or more filter housings may be connected to form a chain of linked filter housings to allow increased filtration of the fluid. For example, FIG. 17 shows two filter heads 140a, 140b directly connected together. It should be appreciated that respective filters bowls would be attached and locked to each filter head during a filtering operation. In the example depicted in FIG. 17, the bayonet-style fitting 262a of the male outlet of the first filter head 140a is configured to releasably engage with the complementary bayonet-style fitting 242b of the female inlet of the second filter head 140b. According to some aspects, a face-seal O-ring may be provided in a grooved seat portion of the male bayonet-type fitting of the outlet so that when a face of the male fitting touches the opposite face of the female bayonet-type fitting of another filter head during engagement, the O-ring seal becomes compressed in order to prevent leakage in between the connected filter housings. This bayonet style of attaching filter housings to each other for a significant amount of time improves the sealing of the filter housings together.

Thus, when a respective bowl is attached to each head, fluid entering the first filter housing enters via the inlet into the head 140 and then flows down into the filter cartridge where the fluid is filtered as it passes through the filter media. Filtered fluid then flows back up along the inside of the bowl and out of the outlet where the process is repeated in the second filter housing. In this manner, a series of consecutive filtering operations may be performed by the filter system. In some implementations, three separate filter housings may be matingly connected to form a chain of filter housings in which the first filter housing includes a first filter cartridge configured to filter particles from the fluid flow, the second filter housing includes a second filter cartridge configured to coalesce entrained droplets from the fluid flow, and the third filter housing includes a third filter cartridge configured to filter vapors from the fluid flow.

While the filter assembly has been described in terms of what may be considered to be specific aspects, the present invention is not limited to the disclosed aspects. The many features and advantages of the invention are apparent from the detailed specification, and, thus, it is intended by the appended claims to cover all such features and advantages of the invention which fall within the true spirit and scope of the invention. Further, it is not desired to limit the disclosure to the exact construction and operation illustrated and described, and accordingly, all suitable modifications and equivalents may be resorted to, falling within the scope of the disclosure. The present disclosure should therefore be considered as illustrative and not restrictive. As such, this disclosure is intended to cover various modifications and similar arrangements included within the spirit and scope of the claims, which should be accorded their broadest interpretation so as to encompass all such modifications and similar structures.

What is claimed is:

1. A filter system, comprising:
a filter housing including:
a bowl configured to house a portion of a filter cartridge, the bowl having a first end, a second end, and a groove defining a bearing surface disposed at or adjacent to the first end;
a head configured to mate with the bowl, the head including an inlet to receive a flow of fluid into the filter housing, and an outlet to release the flow of fluid from the filter housing; and
a lever disposed on the head, the lever configured to selectively secure the head to the bowl, the lever configured to rotate between a locked position in which the bowl is prevented from being removed from the head, and an unlocked position in which the bowl is free to be removed from the head;
wherein the lever includes a cam surface configured to contact the bearing surface of the groove on the bowl when in the locked position, and the cam surface is configured to disengage the bearing surface of the groove on the bowl when in the unlocked position, and where rotating the lever upwardly by approximately 90 degrees in a direction toward the head and opposite to the bowl moves the lever into the locked position.

2. The filter system according to claim 1, wherein the groove is annularly disposed about a rim of the bowl.

3. The filter system according to claim 1, wherein the groove is a straight groove protruding from the bowl.

4. The filter system according to claim 1, further comprising a rod attached to a wing protruding from the head, wherein the lever includes a bore configured to receive the rod such that the lever is operable to rotate about the rod between the locked and unlocked positions.

5. The filter system according to claim 1, wherein rotating the lever downwardly by approximately 90 degrees in a direction toward the bowl moves the lever into the unlocked position.

6. The filter system according to claim 1, wherein an application of a force by the cam surface of the lever against the bearing surface of the groove urges the bowl into the head to form a seal.

7. The filter system according to claim 1, wherein contact between the cam surface of the lever and the bearing surface of the groove tightens when the bowl is pulled away from the head while in the locked position.

8. The filter system according to claim 1, wherein the bowl further comprises an O-ring seat configured to receive an elastomeric O-ring to prevent fluid leakage between the head and the bowl when in the locked position.

9. The filter system according to claim 1, wherein the shape of the head and the shape of the bowl are defined by a 45°-75° ellipse.

10. The filter system according to claim 1, wherein the shape of the head and the shape of the bowl are defined by a 60° ellipse.

11. The filter system according to claim 1, wherein the inlet and the outlet each include a respective bayonet fitting.

12. The filter system according to claim 11, further comprising a second filter housing configured to releasably engage the bayonet fitting of the outlet of the head.

* * * * *